L. ROEHR.
MACHINE FOR WELDING CHAIN LINKS.
APPLICATION FILED AUG. 17, 1908.
923,582.
Patented June 1, 1909.
5 SHEETS—SHEET 1.
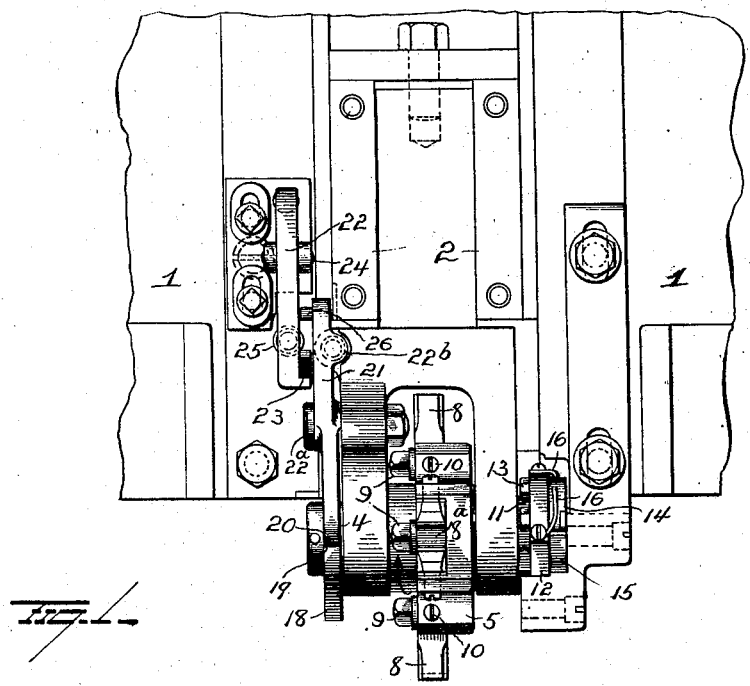
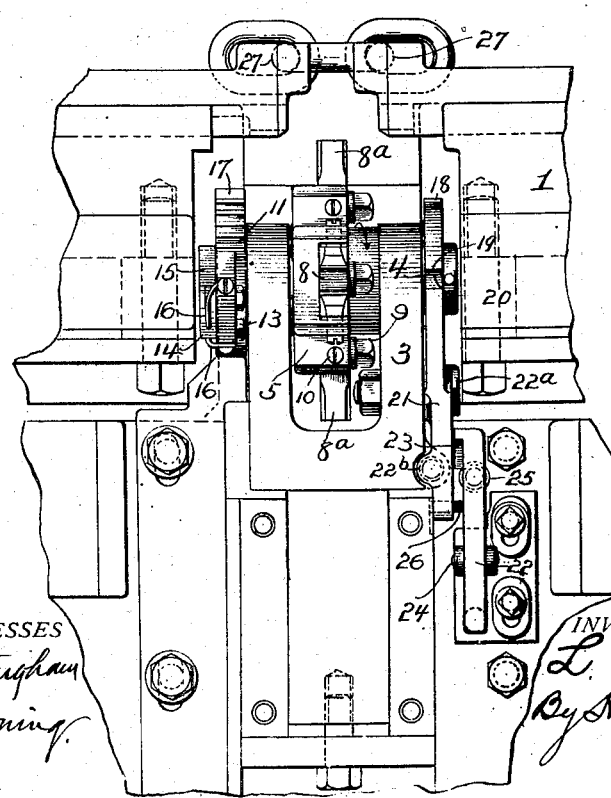
WITNESSES
INVENTOR
L. Roehr
By H. A. Seymour
Attorney

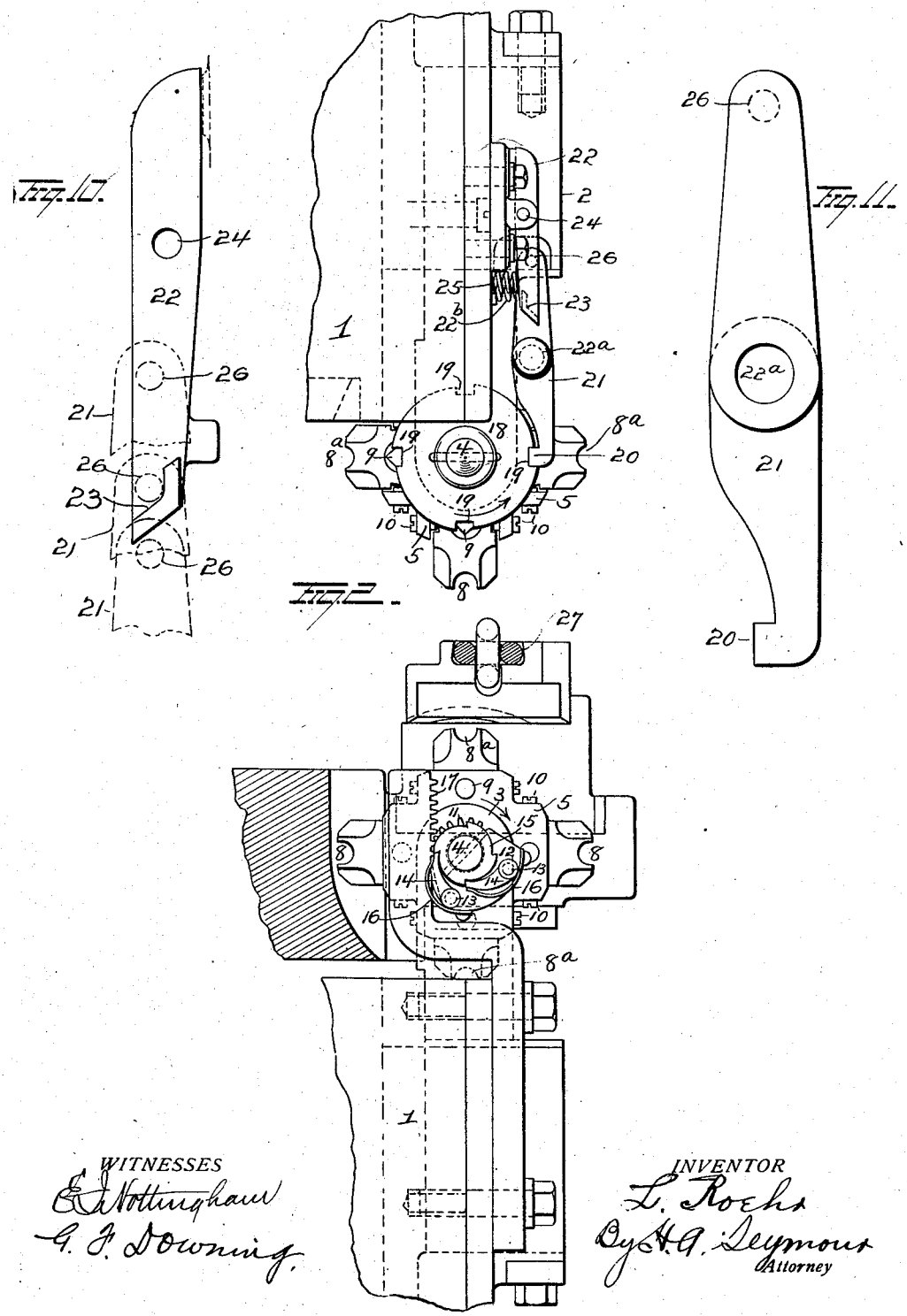

L. ROEHR.
MACHINE FOR WELDING CHAIN LINKS.
APPLICATION FILED AUG. 17, 1908.
923,582.
Patented June 1, 1909.
5 SHEETS—SHEET 3.
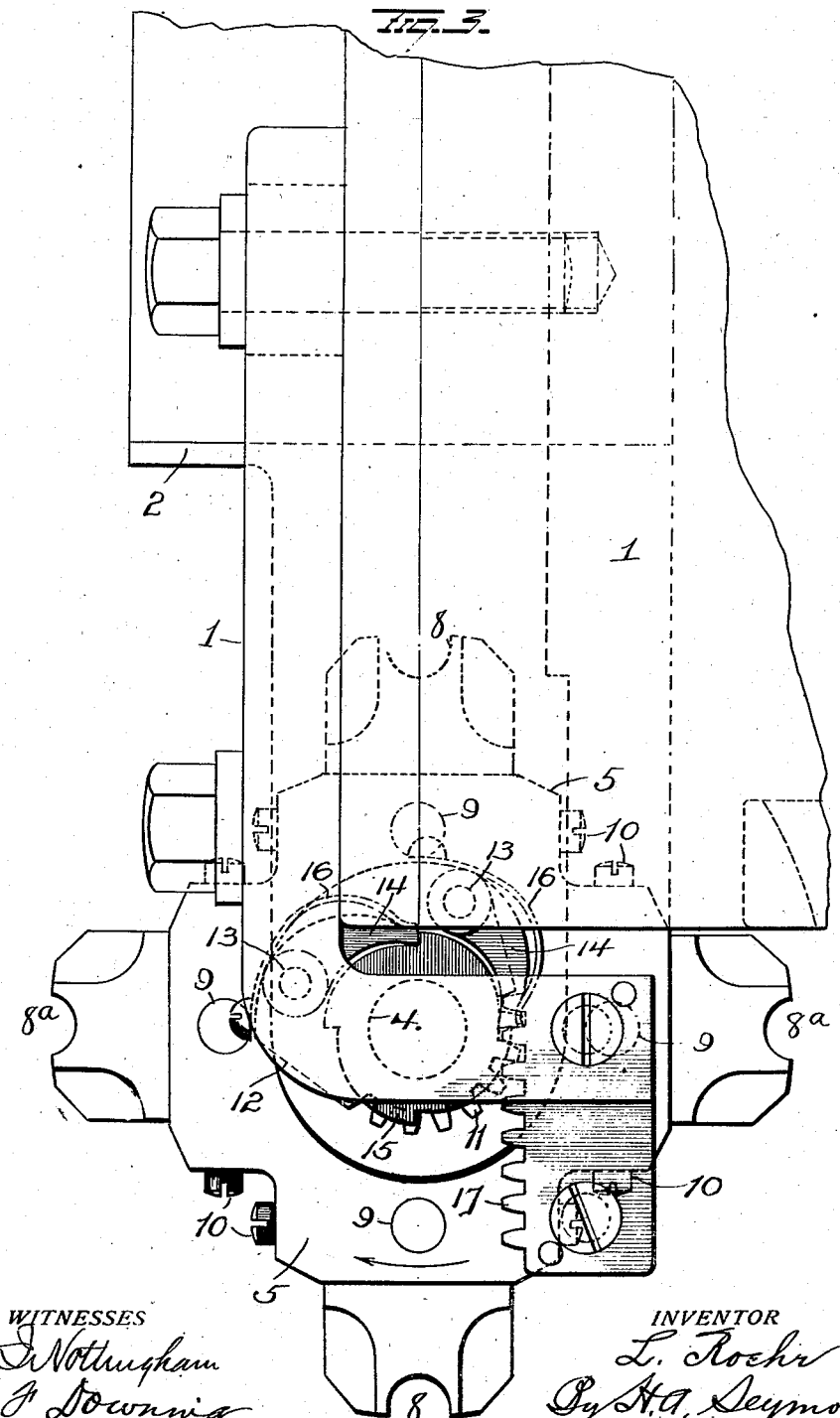
WITNESSES
E. I. Nottingham
G. F. Downing
INVENTOR
L. Roehr
By H. A. Seymour
Attorney L. ROEHR.
MACHINE FOR WELDING CHAIN LINKS.
APPLICATION FILED AUG. 17, 1908.
923,582.
Patented June 1, 1909.
5 SHEETS—SHEET 4.
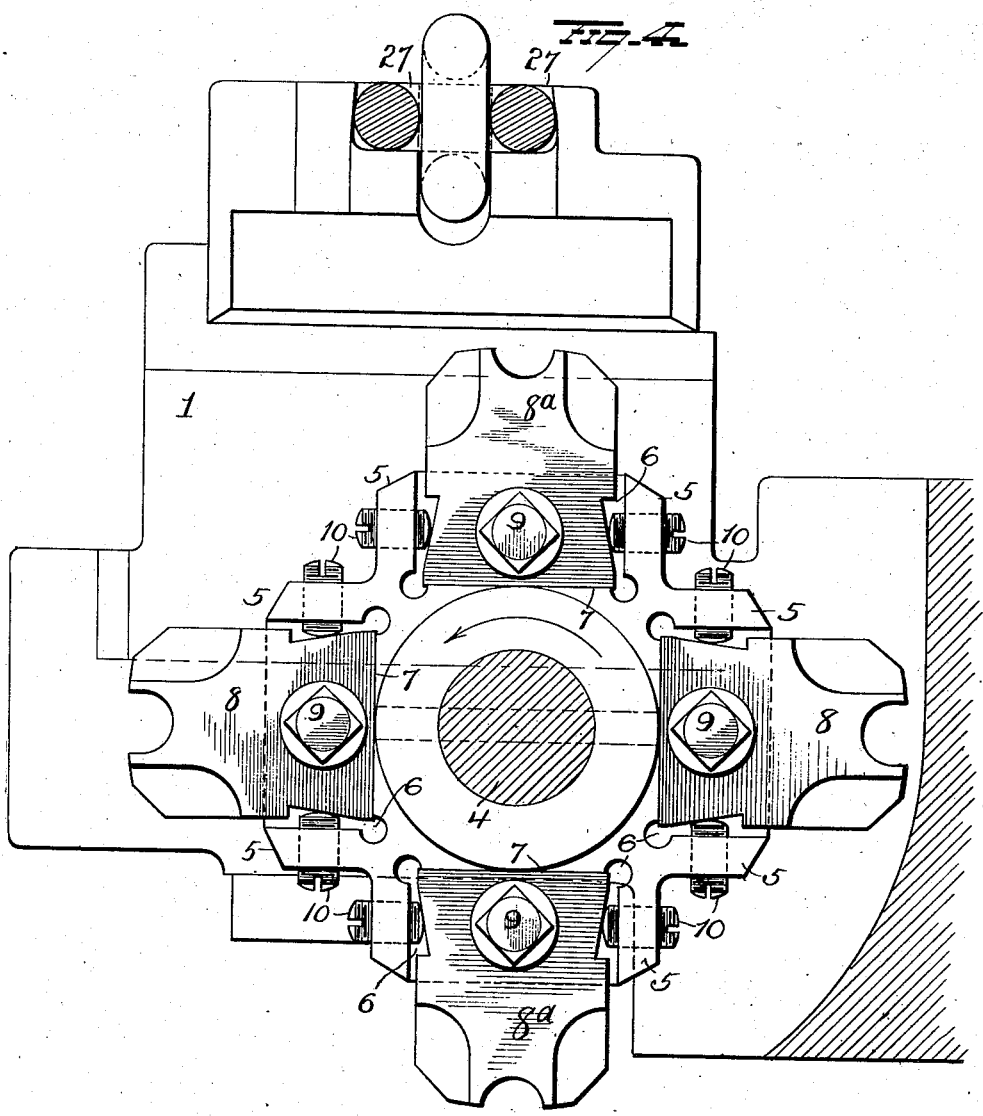
WITNESSES
INVENTOR
L. Roehr
By H. A. Seymour
Attorney

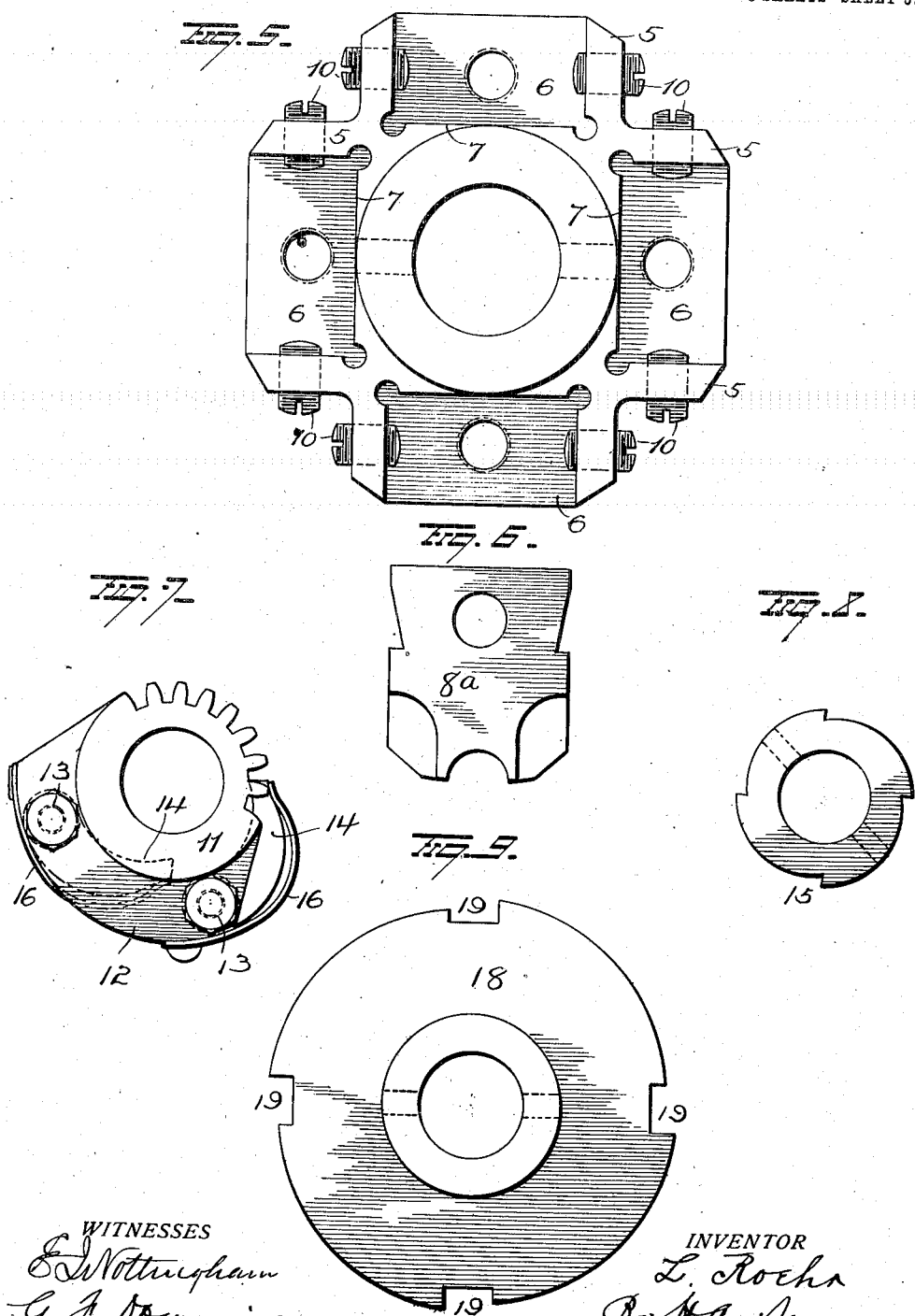

UNITED STATES PATENT OFFICE.

LOUIS ROEHR, OF STAMFORD, CONNECTICUT, ASSIGNOR TO THE YALE & TOWNE MANUFACTURING COMPANY, OF STAMFORD, CONNECTICUT.

MACHINE FOR WELDING CHAIN-LINKS.

No. 923,582.  Specification of Letters Patent.  Patented June 1, 1909.

Application filed August 17, 1908. Serial No. 448,896.

*To all whom it may concern:*

Be it known that I, LOUIS ROEHR, of Stamford, in the county of Fairfield and State of Connecticut, have invented certain new and useful Improvements in Machines for Welding Chain-Links; and I do hereby declare the following to be a full, clear, and exact description of the invention, such as will enable others skilled in the art to which it appertains to make and use the same.

My invention relates to an improvement in machines for welding chain links, and more particularly to improvement on the machine disclosed in Patent 858,758 granted to The Yale & Towne Manufacturing Company, July 2nd, 1907.

In the machine disclosed in the patent above referred to, two dies are carried by reciprocating cross heads, and each die is provided with two lips, one longer than the other. The dies are located in the same vertical plane, with the longer lip of one die in line with the shorter lip of the other die, and as the dies are moved apart after a blow or compressive stroke, they are turned 180 degrees by suitable gearing so as to change the relative positions of the lips of the dies. When the dies are first brought together two fins are formed on opposite sides of the link between the lips of the dies, and as the dies are turned, the tendency of the reversal of the lips of the dies, is to fold the fins produced by the first squeeze or blow, or cut them off, and by a second or more turns and blows of the dies, to completely obliterate the fins and produce a smooth weld.

It has been found in actual practice, that the longer lips of the dies do most of the shearing, and they have a tendency to distort the hot link, first in one direction and then in the other, as the dies are turned through 180 degrees, and thus impair the welded joint.

The object of the present invention is to so construct the dies that the flash or extruded stock caused by the squeezing action of the press dies, is sheared off the link simultaneously and uniformly at both sides of the weld.

A further object is to provide a series of pairs of coöperating dies, each pair of the series being brought successively into position to operate on the joint being welded.

With these ends in view my invention consists in the parts and combinations of parts and in details of construction as will be more fully explained and pointed out in the claims.

In the accompanying drawings, Figure 1 is a view in front elevation showing the upper and lower dies, the machine frame being broken away. Fig. 2 is a view of the same in side elevation, a portion of the lower frame being in section. Fig. 3 is an enlarged view in side elevation of the upper turret, the mechanism for turning same, and a portion of the frame. Fig. 4 is a view of the lower turret from the side opposite that shown in Fig. 2, a portion of the frame and the shaft being shown in section. Fig. 5 is a view in side elevation of the turret. Fig. 6 is a view of one of the dies. Fig. 7 is a view of the toothed wheels carrying the pawls. Fig. 8 is a view of the ratchet ring. Fig. 9 is a view of the turret holding disk. Fig. 10 is a view in side elevation of the yielding trip for releasing the turret holding disk and Fig. 11 is a view of the pawl for locking the turret holding disk.

1 represents a frame of any suitable construction, 2 the upper cross head and 3 the lower cross head, the two cross heads being located in line as shown in Figs. 1 and 2, and connected up so as to move toward and away from each other in unison, whereby the dies, to be hereinafter described, simultaneously engage the opposite sides of the joint to be welded, the lower die constituting the anvil and the upper one the hammer.

As the tool holders or turrets and other parts carried by the two cross heads are alike in construction and operation, I will describe the lower one in detail and apply the same reference characters to the upper one.

Mounted in the bifurcated upper end of the lower cross head 2 is the shaft 4 carrying the fixed turret 5. This turret comprises a central hub, and four recessed seats 6, the latter being oppositely disposed as shown in Fig. 4, and each is provided with a flat base 7 on which the dies 8 and $8^a$ solidly rest. The recessed seats 6 are open at one side, and the dies are secured in place by the bolts 9, passing through the dies and into the side walls of the seats, and are adjusted laterally by the set screws 10 passing through the end walls of the seats 6, and engaging inclined or wedge shaped sides of the dies. By means of these set screws the dies of the upper and lower turrets may be adjusted laterally to produce a perfect alinement between the upper and lower dies.

The dies 8 of each turret are provided with curved recesses the lips at the sides of the recesses in the dies 8 being longer than those of the dies 8$^a$, the recesses in the latter dies being less than a half circle. The two dies 8 are oppositely disposed in the same plane and the dies 8$^a$ are also oppositely disposed in a plane at right angles to the dies 8, and the dies of the two turrets are so arranged that the dies 8$^a$ of one turret coöperate with the dies 8 of the other turret.

Loosely mounted on the shaft 4, is the wheel 11 shown detached in Fig. 7. This wheel is toothed part way its periphery and is provided with the flange 12, the latter being integral with the wheel or fixed thereto so as to rotate therewith. Pivotally mounted on pins 13 carried by flange 12, are the pawls 14 the free ends of which are yieldingly held in contact with the toothed edge of the ratchet ring 15 by the springs 16. The ratchet ring 15 is keyed, or otherwise secured to shaft 4, so that when the ring is turned by the pawls 14, the shaft 4, carrying the turret will also be turned.

Secured to the frame 1 of the machine, with its teeth in a position to engage the teeth of wheel 11, is the rack bar 17. The teeth of the ratchet ring and the pawl are so located with relation to the toothed wheel 11, that as the cross head descends the ends of the pawl engage the teeth on the ratchet ring and move the latter through an arc of ninety degrees, thus turning the shaft 4 and turret 5, whereas in the ascent of the cross head, the pawls 14 move in the opposite direction over the teeth on ratchet, the shaft and its turret, remaining in the position, to which these parts were turned during the descent of the cross head.

There are four teeth on the ratchet ring, corresponding to the four dies carried by the turret, and the parts are so constructed and adjusted that one downward movement of the cross head turns the shaft one quarter of a revolution, thus moving one die from its operative position and carrying the next succeeding die up to its operative position.

Secured to shaft 4 at the end farthest removed from the toothed wheel 11, is the turret locking disk 18. This disk is provided on its periphery with four recesses 19 one for each die carried by the turret, which recesses are successively engaged by the toothed end 20 of the disk holding pawl 21. This pawl is pivoted at 22$^a$ to the front of the cross head 3, a spring 22$^b$ being interposed between the cross head and the lower free end of the pawl for holding the upper toothed end of the pawl 21 in contact with the periphery of disk 18.

Pivoted to the frame of the machine adjacent to the pawl 21, is the yielding tripping lever 22 provided at its upper end with the laterally projecting lip 23 the upper and lower faces of which are inclined as shown in Fig. 10. This lever is pivoted at 24 to frame of the machine, and its end provided with the lip 23 is yieldingly forced outwardly by the spring 25 interposed between the frame 1 and the lever, the outward movement of the lipped end of the lever being limited by the engagement of the lower end of said lever with the frame of the machine.

Normally the tooth 20 of lever 21 rests within a notch 19 of the disk 18, and holds the latter, together with the shaft 4 and turret 5 on the shaft, against movement. As the cross head ascends, carrying the die toward the link to be welded, the pin 26 on the lower end of disk locking pawl 21 engages the lower upwardly and outwardly inclined face of the tripping lever 22, thus forcing the upper end of the latter inwardly against the pressure of its spring. As the pin leaves the lip the lever 22 assumes its normal position, with the lip 23 in the path of downward movement of the pin. During this upward movement of the lower cross head, the pawls 14 ride over the teeth on ratchet ring 15, thus permitting the toothed wheel 11 to be rotated on shaft 4, by its engagement of the wheel with the rack bar 17. During the descent of the lower cross head the rotation of the toothed wheel 11 by rack bar 17, carries the ends of pawls 14 into engagement with the teeth on the ratchet ring 16, and as the latter is fixed to shaft 4, the latter and the turret thereon are turned one quarter turn so as to bring the next succeeding die 8 or 8$^a$ into position to engage the link being welded. Just prior to the engagement of the ends of pawls 14 with the teeth of the ratchet ring 15, the pin 26 on disk holding pawl 21 comes into contact with the downwardly and rearwardly inclined face of the lip 23 on lever 22, and as the upper end of lever 22 is prevented from moving outwardly by the engagement of the lower end of said lever with the frame of the machine, the lower end of disk holding pawl is necessarily forced inwardly, thus withdrawing the tooth 20 from the notch in the disk 18, and leaving the disk and shaft and all the parts carried by the latter free to be turned by the engagement of toothed wheel 11 with the rack bar 17. As the pin 26 leaves the lip 23, the tooth 20 of disk holding pawl 21 moves into contact with the periphery of disk 18 and drops into the next succeeding recess, and again locks the disk and shaft 4 until the next downward stroke of the cross head. The toothed wheel 11 and rack bar 17 are so constructed to impart a quarter turn only to shaft 4, and the parts are so adjusted that when the shaft 4 is locked by the disk holding pawl 21, one die will be in position to coöperate with the upper die in welding the link.

The upper cross head and parts carried thereby, are simply duplicates of the lower cross head and coacting parts reversed, or turned upside down hence by reversing the terms upper and lower, used in describing the location and operation of the parts carried by the lower cross head, the above will apply to the upper cross head and its connected parts.

The two turrets move simultaneously in opposite directions, each is turned while moving in a direction away from the members being welded, and are held against movement while moving toward the parts being welded.

In the operation of the machine, the link to be welded is seated on and between the clamps 27 which may be of any preferred form, with the joint to be welded in the plane of the upper and lower welding dies. The dies are so placed that the dies 8 of the lower turret coact with the dies 8ª of the upper turret. The welding heat is produced by electricity or by any proper means, and while in its heated condition and clamped, the two abutting ends of the link are forced into contact producing a bulge at the joint.

One revolution of the turret, or the action of the four pairs of dies is sufficient to reduce the weld. At the first stroke, fins are formed on opposite sides of the link above or below the horizontal center of the link. If the first stroke be with a long lipped die in the upper turret and a short lipped die in the lower turret, the fins will be below the horizontal center. In their movements away from the link, both turrets will be turned one quarter revolution, and on the next welding stroke, a long lipped die on the lower turret will coact with a short lipped die on the upper turret. By this means the fins or extruded stock squeezed out by the first dies will be sheared off simultaneously and uniformly at both sides of the link by the next succeeding dies, so that upon the completion of the action of the machine a perfect, and uniform and smooth weld will have been formed.

One advantage in using a plurality of press dies, is in the fact that each die comes in contact with the hot metal only once during a weld, whereby in the machine previously referred to a single pair of dies is used to reduce and shape the weld. Again with my present machine, the dies which first press the weld and receive the most heat, may be simply the roughing dies, while those which follow, may be the finishing dies and be subjected to much less severe service, thus materially increasing the life of all the dies.

Means such as is shown in Patent 858,758 may be employed for reciprocating the cross heads, but it is evident that other power transmitting means may be used and that other parts may be altered without departing from the spirit and scope of my invention.

Having fully described my invention what I claim as new and desire to secure by Letters-Patent, is:—

1. In a machine for welding, the combination with means for holding the members to be welded, and two reciprocating tool holders located on opposite sides of the holding means each holder carrying a plurality of alternately long and short lipped dies, the long lipped dies of one tool holder coacting with the short lipped dies of the other, of means for partially rotating the tool holders while the dies are out of contact with the members being welded so as to bring the next succeeding pair of dies into operative position.

2. In a machine for welding the combination with two tool holders each carrying a plurality of long and short lipped dies, the long lipped dies of each tool holder coacting with the short lipped dies of the other tool holder, of means whereby the tool holder may be moved while the dies are out of contact with the members being welded so as to bring the next succeeding pair of dies into operative position.

3. In a welding machine the combination with two reciprocating tool holders one carrying a die having two long lips and the other carrying a die having two short lips the latter coacting with the long lipped die, of means intermediate the tool holders for holding the members to be welded.

4. In a welding machine the combination with two reciprocating tool holders and a plurality of alternately arranged long and short lipped dies in each holder, of means for partly rotating the tool holders while the dies are out of contact with the members being welded, and means for locking the tool holders during the forming stroke of the dies.

5. In a welding machine, the combination with reciprocating cross heads, a shaft carried by each, a turret fixed to each shaft and a plurality of alternately arranged long and short lipped dies carried by each turret, of means for rotating the shafts, means for locking the shafts, and means for disengaging the locking means so as to permit the shafts to be rotated once during each complete forming stroke.

6. In a welding machine the combination with a frame and means carried thereby for supporting the members to be welded, of two reciprocating cross heads mounted in the frame on opposite sides of said supporting means, a shaft carried by each cross head, a toothed wheel loose on each shaft, a fixed rack bar for each toothed wheel, a pawl carried by each wheel, a ratchet ring carried by each shaft, each ring being engaged by its respective pawl, means for locking the shafts against rotation and means for disengaging the locking means.

7. In a welding machine the combination with a reciprocating tool holder, a locking disk fixed with relation to the tool holder and means for imparting a part rotation to the tool holder once during each welding stroke, of a yielding pawl engaging the locking disk for holding the tool holder against movement, and a yielding tripping lever for moving the pawl out of engagement with the locking lever just prior to the rotation of the tool holder.

In testimony whereof, I have signed this specification in the presence of two subscribing witnesses.

LOUIS ROEHR.

Witnesses:
SCHUYLER MERRITT,
F. G. HALDY.